United States Patent [19]

Dann

[11] Patent Number: 4,489,354

[45] Date of Patent: Dec. 18, 1984

[54] INFORMATION RECORDING SYSTEM WITH RECORDING PROCESS MONITORING FUNCTION

[75] Inventor: Bert H. Dann, Saratoga, Calif.

[73] Assignee: Eastman Kodak Company, Rochester, N.Y.

[21] Appl. No.: 408,102

[22] Filed: Aug. 16, 1982

Related U.S. Application Data

[63] Continuation-in-part of Ser. No. 210,468, Nov. 24, 1980.

[51] Int. Cl.³ .................. G11B 15/12; G11B 15/02
[52] U.S. Cl. ............................... 360/64; 360/22
[58] Field of Search .................. 360/28, 29, 27, 36, 360/64, 18, 22, 23

[56] References Cited

U.S. PATENT DOCUMENTS

| 3,188,615 | 6/1965 | Wilcox | 360/20 |
| 3,294,902 | 12/1966 | Maxey | 360/64 |
| 3,532,808 | 10/1970 | Fujisawa | 360/27 |
| 4,263,625 | 4/1981 | Warren | 360/31 |
| 4,389,681 | 6/1983 | Tanaka et al. | 360/27 |
| 4,413,288 | 11/1983 | Hurst | 360/27 |

Primary Examiner—Vincent P. Canney
Attorney, Agent, or Firm—Dennis P. Monteith

[57] ABSTRACT

The same recording head or heads may be employed to record both an information signal and a synchronization word signal. Where at least two recording heads provide overlap intervals in the recording of the information signal, the synchronization word signal may be recorded in such overlap intervals. Upon playback, the synchronization word signal may be employed to control at least part of the reproduction of the information signal.

7 Claims, 9 Drawing Figures

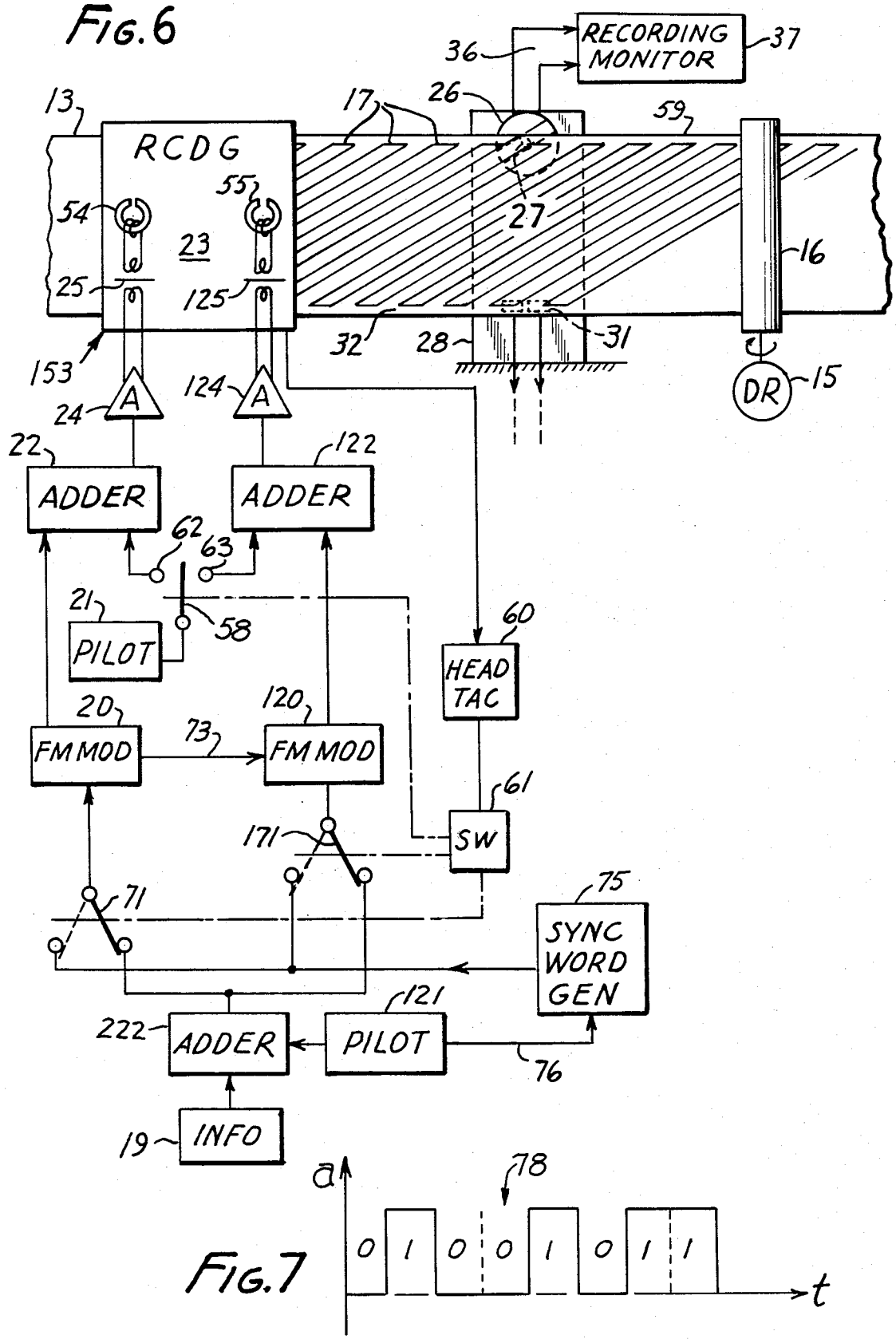

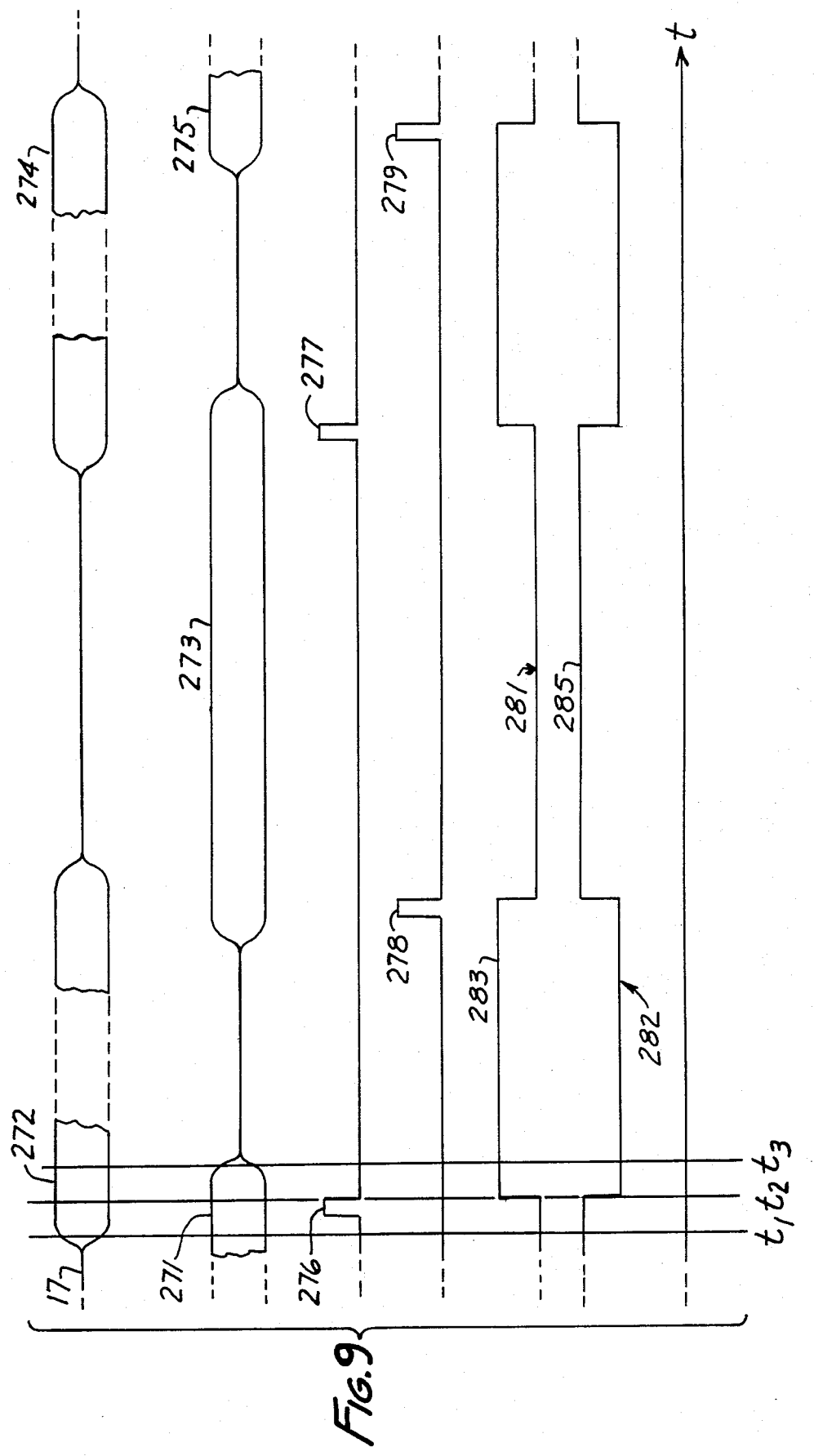

INFORMATION RECORDING SYSTEM WITH RECORDING PROCESS MONITORING FUNCTION

CROSS-REFERENCE

This is a continuation-in-part of application Ser. No. 06/210,468, filed by me on Nov. 24, 1980 and assigned to the common assignee hereof.

FIELD OF THE INVENTION

The subject invention relates to information recording and playback and, more specifically, to information recording systems with an information process monitoring function which checks continuously whether information to be recorded has actually been recorded.

DISCLOSURE STATEMENT UNDER 37 CFR 1.56(a)

Information recording systems have been known in which the recording process is constantly being monitored for defects. For instance, a known slant track recorder with rotating information recording heads employs a stationary slanted playback head positioned in a center region of the recording tape path and connected to a filter/amplifier tuned to the track passage rate for the purpose of detecting a defective rotating head. The particular recording apparatus modulates the information to be recorded on an FM carrier and the recording process monitoring system relies on a detection of the FM carrier component in the recorded slant tracks.

In practice, that proposal did not work well, since it was very difficult to reproduce an FM carrier which has a wavelength on tape of approximately 100 microinches and was varying rapidly in frequency. It should be kept in mind in this respect that the linear tape speed, relative to the slanted monitoring playback head, is some 100 to 200 times lower than the head-to-tape speed at the rotating recording heads.

Also, spacing losses and azimuth errors at the monitoring head can have drastic results, rendering the system undependable despite a relatively high required playback amplification, and leading to an excessive false alarm rate. In this respect, reference may be had to the book MAGNETIC RECORDING, by Charles E. Lowman (McGraw-Hill 1972), pp. 78 to 80, showing the consequences of incorrect head-azimuth alignment, including drastic amplitude falloff in the high-frequency region. In the above mentioned system, if the azimuth of the monitoring playback head was not accurate to minutes of arc with respect to the slant tracks, no useful monitoring signal was obtainable.

Another approach used in a video recording situation employed a detection of the horizontal synchronization signal for recording operation monitoring purposes. Such approaches, which rely on a video synchronization signal, are, of course, restricted in utility to the video recording field. Also, such approaches are further limited to recording techniques in which drastic signal level changes occur within the synchronization signal, such as at sync tip.

An application or extension of traditional read-after-write technology also founders in many practical situations, such as in the case of rotary multi-head, high-frequency or broadband recording.

By way of reflection after the fact of the invention herein disclosed, it may be noted that in the area of time base correction and time reference for servo control of the scanner during reproduction, which is a field different from recording process monitoring, pilot signals have been recorded during the information recording process, in order to be reproduced during the subsequent information playback process for time base correction and timing reference purposes. In this respect, and also with reference to the recording of pilot signals at various frequencies, reference may be made to U.S. Pat. No. 2,811,578, by J. W. Rieke, U.S. Pat. No. 2,979,558, by E. M. Leyton, U.S. Pat. No. 3,188,615, by D. D. Wilcox, Jr., U.S. Pat. No. 3,304,377, by E. K. Kietz et al, and U.S. Pat. No. 3,571,526, by P. R. Stockwell. Despite its long standing, that pilot signal technology has not resulted in a solution of the subject problem concerning a monitoring of the recording process itself in the sense of a detection of one or more defective recording heads or similar defects in the recording operation.

To the contrary, a reference published only after the filing date of the subject parent application still attempted verification of video recording with the aid of the recorded FM carrier signal. In particular, British patent application No. 2,055,239, filed by RCA Corporation (Inventor H. R. Warren), and published Feb. 25, 1981, proposes employment of a stationary pickup head system for effecting verification of video recording from the recorded FM carrier signal. That proposal thus fell into the category of the above mentioned system which encountered difficulties in reproducing the FM carrier in view of its naturally long, recorded wavelength and rapidly varying frequency.

A subsequent proposal by the same inventor, disclosed in U.S. Pat. No. 4,263,625, mentions the latter proposal, but employs recorded vertical synchronization signals for verification of headwheel servo loop locking with a stationary head in a video signal recorder.

Other proposals also failed to offer a solution of the subject problem concerning a monitoring of the recording process with respect to the area of fixed and rotating recording, playback, control and monitoring heads as may, for instance been seen from U.S. Pat. No. 2,791,640, by W. V. Wolfe, U.S. Pat. No. 3,188,385, by N. Kihara, U.S. Pat. No. 3,225,135, by I. Osawa et al., U.S. Pat. No. 3,278,678, by W. Rank, U.S. Pat. No. 3,308,232, by T. Numakura, U.S. Pat. No. 3,337,859, by H. Yoshii, U.S. Pat. No. 3,549,797, by B. H. Dann, U.S. Pat. No. 3,617,652, by G. Krause, U.S. Pat. No. 3,838,453, by W. S. Buslik et al, and U.S. Pat. No. 4,163,262, by H. Kaemmerer.

Also, it has been well known that decreases in bias current level in magnetic recording drastically affect the recorded level on the medium, as may, for instance, be seen from Stewart, MAGNETIC RECORDING TECHNIQUES (McGraw-Hill 1958), pp. 18 and 19. However, recognition of that well-known effect has not heretofore resulted in a sophisticated recording process monitoring technique.

SUMMARY OF THE INVENTION

It is a general object of this invention to overcome the disadvantages and to satisfy the needs expressed or implicit in the above disclosure statement or in other parts hereof.

It is a germane object of this invention to provide improved information recording methods and apparatus.

It is a related object of this invention to provide improved read-after-write technology.

It is a similar object of this invention to provide improved information recording process monitoring and verifying systems.

It is also an object of this invention to provide new uses for recorded pilot signals.

It is a further object of this invention to improve the quality of information recording and playback processes. Other objects will become apparent in the further course of this disclosure.

From one aspect thereof, the subject invention resides in the improvement comprising in combination the steps of providing recording head means including two recording heads, providing a recordable information signal and a synchronization word signal; employing the recording head means for recording both the information signal and the synchronization word signal in a recording operation with the recording heads providing recording overlap intervals in the recording of the information signal, and the synchronization word signal being recorded in such overlap intervals, reproducing the recorded information and synchronization word signals, and controlling at least part of the reproduction of the information signal, with the reproduced synchronization word signal.

The subject invention also resides in information recording apparatus for carrying the mentioned improvements into effect, and for effecting information recording process monitoring and verifying functions.

Other aspect of the subject invention will become apparent in the further course of this disclosure and no limitation to any specific aspect, feature or combination is intended by this summary.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or functionally equivalent parts, and in which:

FIG. 6 is a diagrammatic showing of an information recording apparatus and synchronization and pilot signal recording and monitoring functions according to an embodiment of the subject invention;

FIG. 7 is a graph showing an example of a synchronization word;

FIG. 9 is a timing diagram illustrating phases of operation of the system or apparatus of FIGS. 6 and 8.

DESCRIPTION OF PREFERRED EMBODIMENTS

Figure 1:
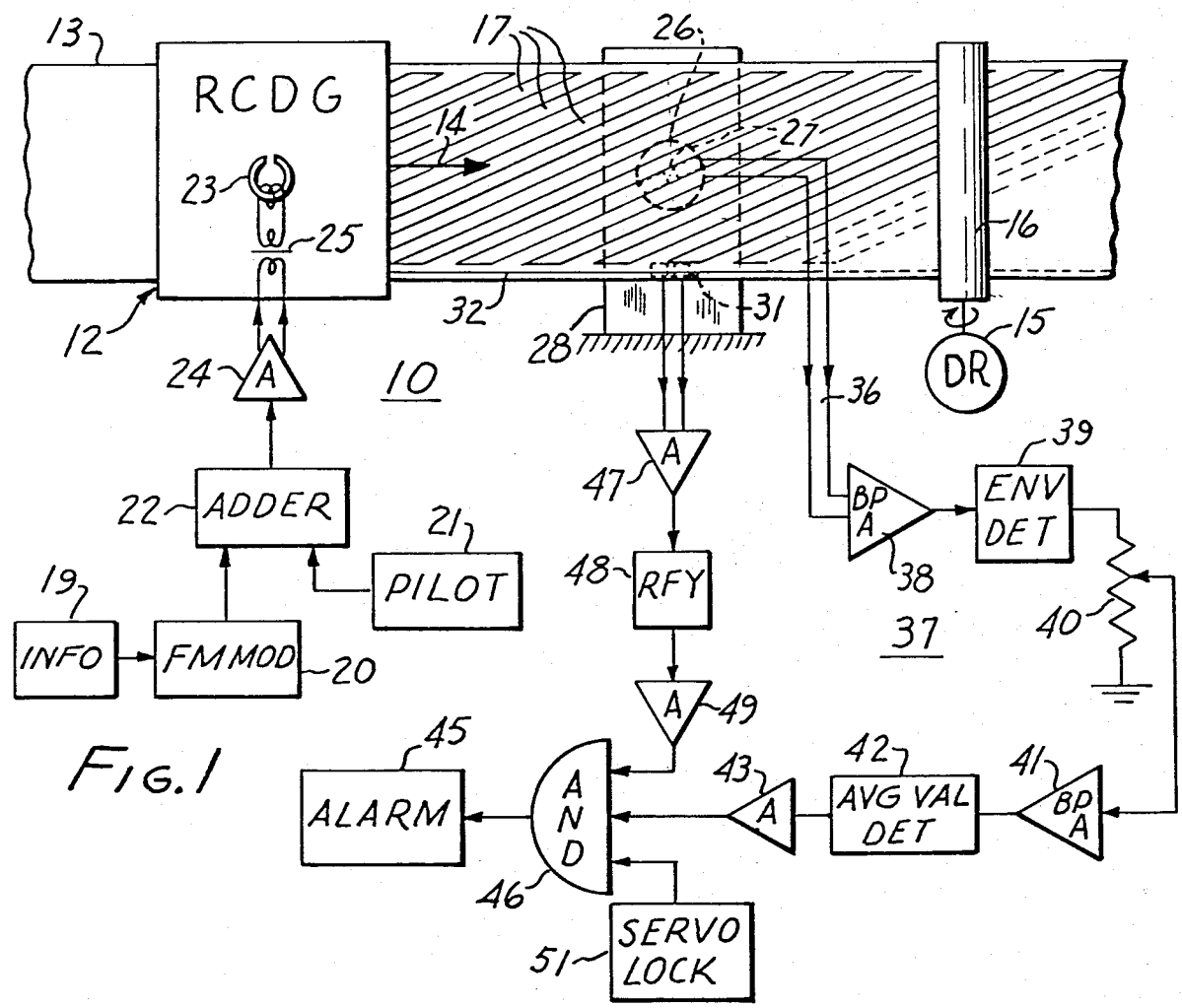
FIG. 1 is a diagrammatic showing and block diagram of an information recording apparatus with information recording process monitoring.

The information recording system 10 shown in FIG. 1 has a recording apparatus 12 for recording information and pilot signals on a recording medium 13. By way of example and not by way of limitation, the recording medium may be a magnetic recording tape 13 that is advanced in the direction of arrow 14 by a symbolically illustrated tape drive 15 having a rotating tape capstan 16 engaging and propelling the magnetic recording tape. Also by way of example, the recording apparatus may be of the slant track recording type, as indicated by the slanted recording tracks 17 shown on the recording tape for the purpose of illustration. In a practical system, the recording surface of the tape 13 would preferably be opposite the surface engaged by the capstan 16. In reality, therefore, the tracks 17 preferably face away from the observer in FIGS. 1 and 4.

As indicated by the block 19, the illustrated system generates or receives information to be recorded on the tape 13 and, as indicated by the block 20, modulates a carrier with such information to produce a recordable information signal. By way of example, frequency modulation has been indicated in FIG. 1 for the information signal.

As indicated by the block 21, the invention provides a pilot signal for recording along with the information signal on the tape 13. For instance, the pilot signal may be added to the modulated information signal, as indicated by the block 22.

According to a preferred embodiment, the carrier or modulated information signal, produced at 20, is employed as a bias for the pilot signal in the recording operation at 12.

The combined information and pilot signals are applied to at least one recording device or head 23 for joint recording on the tape 13. To this end, the combined information and pilot signals may be amplified by a recording amplifier 24 and, if the head 23 is of a rotating or other moving type, may be applied to such head via a rotary transformer 25 or other rotary device.

In this respect, it should be recognized that the practice of the subject invention is not limited to a particular recording technique, but that slant track or helical scan recording is mentioned here as an example of particular utility of the subject invention. Also, while the invention may be practiced with video tape recording (VTR), it also has utility with other types of broadband recording, generally symbolized in FIGS. 1 and 4 by a block labeled RCDG.

The illustrated preferred embodiments subject the information and pilot signals to a recording operation in predetermined recording tracks 17, common to such information and pilot signals.

During that same recording operation, that is while the recording operation is in progress, the subject invention reproduces the pilot signal as recorded. To this end, the illustrated preferred embodiments employ a playback head 26.

It may thus be seen that the subjection of the information and pilot signals to a recording operation in the illustrated preferred embodiments includes recording the information and pilot signals on an advancing recording medium with recording head means 23. In tracks 17 common to the information and pilot signals, and that the reproduction of the pilot signal during such recording operation includes picking up the pilot signal from the common tracks 17 with playback head means 26. These playback head means are maintained stationary relative to the advancing recording medium 13 for a pickup of the pilot signal, while the recording head means 23 are moved relative to the advancing recording medium for the recording of the information and playback signals.

Where the subjection of the information and pilot signals to a recording operation includes recording of the information and pilot signals on an advancing recording medium 13 in slanted tracks 17 common to the information and pilot signals, the reproduction of the pilot signal according to the illustrated preferred embodiments of the invention includes reproducing the pilot signal from such slanted tracks. In particular, a preferred embodiment of the subject invention provides a playback head 26 having a slanted pickup gap 27, and picks up the pilot signals from the slanted tracks 17 with such playback head at the slanted pickup gap.

No novelty is herein claimed for such slanted pickup per se.

A stationarily mounted head support 28 constitutes a means for maintaining the playback head 26 stationary relative to the advancing recording medium 13 during pickup of the pilot signal with such playback head.

In practice, the stationary bracket or post 28 may also support other heads, such as a control signal head 31 for recording and subsequently reproducing control signals from a control signal track 32 and audio heads (not shown) for recording and subsequently reproducing audio accompaniments or other information from audio tracks (not shown) which, for instance, may be provided in a margin of the tape 13 opposite the control track 32. In accordance with customary practice, the control track may include signals for controlling the relative motion of information recording head means and recording medium during playback. In this respect, the recording apparatus 12 may include a control signal recording head (not shown) similar to the head 31 for recording in the control track 32 signals derived from a rotating head mount of the recording head means 23. During subsequent playback of the recorded information, such signals are played back from the control track 32 and are employed to control the rotation of the rotary playback head mount.

Prior to the subject invention, the recording process monitoring function was restricted to the expediencies of the information recording process itself. For instance, in the above mentioned examples where the recording monitoring function relied on a reproduction of an FM carrier from the tape, such monitoring function was restricted by the fact that the carrier on which the monitoring function depended had to be selected with respect to frequency on the basis of optimum suitability for the recording process, rather than suitability for the recording monitoring function.

In consequence, a typical FM carrier had a wavelength on tape of approximately 100 microinches and was varying rapidly in frequency, as mentioned above. Also, the reproduction of such FM carrier with a stationary head was particularly sensitive to azimuth errors and head-to-tape spacing losses, producing excessive "false alarm" rates on the one hand, and failures to indicate defects in the recording operation, on the other.

According to an embodiment of the subject invention, the solution to these problems lies in the recording and reproduction of a steady-frequency long-wavelength pilot signal for recording process monitoring purposes. To this end, the component 21 may include a crystalcontrolled pilot signal generator.

Figure 2:
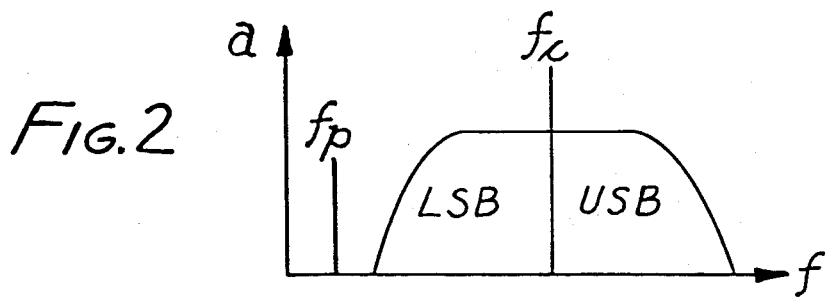
FIG. 2 is a graph showing an example of a pilot frequency relationship in the operation of the apparatus of FIG. 1.

In practice, the information and pilot signals may be subjected to spectrum sharing in order to avoid mutual interference therebetween. For instance, where the carrier at $f_c$ is angle modulated with the information 19 to produce a recordable information signal having useful sidebands, the pilot signal may be provided at a frequency $f_p$ below such useful sidebands, as shown in FIG. 2. In practice, the recorded information signal may have upper and lower sidebands (USB, LSB), as indicated in the amplitude-versus-frequency plot of FIG. 2.

Figure 5:
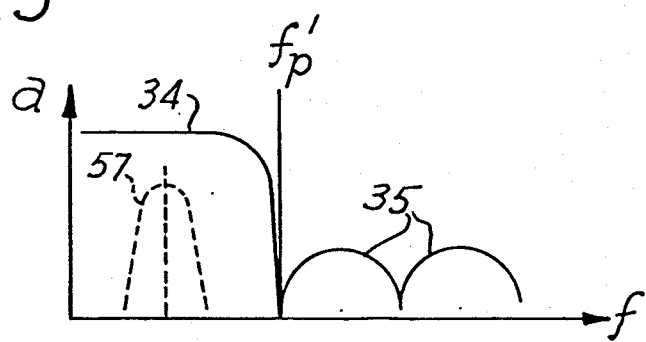
FIG. 5 is a graph illustrating an example of a pilot signal frequency relationship which may occur in the operation of the apparatus of FIG. 4.

Alternatively, where the carrier is angle modulated with the information to produce a recordable information signal including an information band, the pilot signal may be provided with a frequency $f_p'$ located at an edge of the information band 34, as indicated in the amplitude-versus-frequency plot of FIG. 5, which also shows filter side lobes 35 above the pilot frequency.

By way of example, the subject invention may be practised with frequency modulation (FM), pulse interval modulation (PIM), or digital recording.

Reverting for the moment to FIG. 2, a realistic value for the carrier frequency $f_c$ in the case of video recording is 12 MHz. With a practical rotary head-to-tape speed of about 200 times the linear tape speed in the case of slant track recording, a stationary head, attempting to pick up the recorded FM carrier for monitoring purposes, would pick up such carrier at a frequency of about 60 kHz. In practice, such a high frequency would render the monitoring system particularly vulnerable to azimuth errors between the gap of the monitoring head and the recorded slant tracks since, as mentioned above, such azimuth errors cause a rapid falloff of the head output signal in the higher frequency region.

On the other hand, this is one of the problems which the subject invention avoids by the use of a pilot signal. For instance, if the pilot signal produced at 21 is recorded with the rotary head means 23 at a frequency of, for example, 500 kHz, and if the head-to-tape speed is again approximately 200 times the linear tape speed, then the stationary slanted head 26 reproduces such recorder pilot signals at a frequency of about 2500 Hz. The pilot signal, as sensed by the monitoring head, is thus in a frequency region which is rather tolerant of azimuth errors between the gap 27 of the monitoring head and the slanted recording tracks 17. Other losses, such as eddy current losses, bias erasure losses, gap losses and demagnetization losses, are also considerably lower at that lower frequency, than they would be in a higher frequency band of the playback curve.

The pilot signal picked up by the stationary playback head 26 is applied via leads 36 to a recording process monitor 37 which supervises the recording process while such process is in progress, supplying an alarm condition or taking other measures when a disturbance in the recorded pilot signal is detected, indicating a disturbance in the recording of the desired information signal or otherwise in the recording process.

Figure 3:
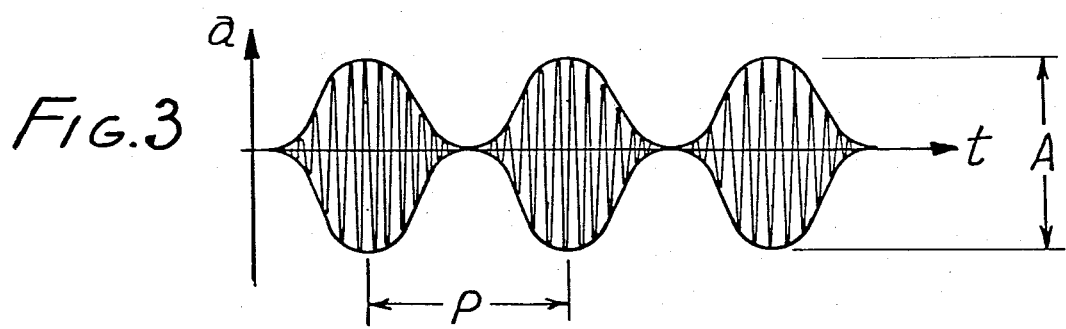
FIG. 3 is a graph showing a resulting signal in the operation of the apparatus of FIG. 1.

By way of example, a common failure to record occurs from a loss of coupling between a recording head and the recording medium due to foreign matter or other influences. While it is relatively easy to verify application of signals to the recording head, such a verification does not necessarily signify that any recording is taking place. It is an object of the subject invention to remedy this deficiency in a novel manner In the embodiment shown in FIG. 1, the recording monitor 37 includes a playback amplifier 38, an envelope detector 39, a potentiometer 40, an amplifier 41, an average value detector 42, and an amplifier 43 connected to the average value detector 42. The played-back pilot signal is diagrammatically shown in the amplitude-versus-time plot of FIG. 3, wherein A designates the amplitude and P the period of the picked-up monitoring signal. The playback amplifier 38 may include a wideband pre-amplifier stage and a subsequent bandpass amplifier stage and the envelope detector 39 may be of a conventional type, supplying the potentiometer 40 with a signal following the envelope of the reproduced pilot signal shown in FIG. 3. The amplitude of such envelope signal may be adjusted at 40 and is applied to the bandpass amplifier 41 operating at track rate. The average value detector 42 may also be of a conventional type, supplying a direct-current level in response to the envelope signal received at 41. The component 43 may include a voltage comparator which compares the direct-current level provided by the average value detector 42 with a reference level and which thus supplies an output signal indicating whether the played-back pilot signal manifests a perfect information signal recording operation.

The output of the comparative amplifier 43 may thus be applied to an alarm circuit 45, supplying an alarm condition if the value of the detected picked-up pilot signal is not up to par with the comparative reference signal.

In the preferred embodiment shown in FIG. 1, the output of the comparative amplifier 43 is applied to an AND element 46 which also receives other inputs for a more complete supervision of the information recording process. For instance, one additional input of the AND element 46 may derive a signal from the control track head 31, indicating whether the control signal generating and recording process is functioning properly. To this end, the requisite playback process control signal may be recorded in the control track 32 by a recording head embedded in the scanner of the rotating recording apparatus 12. Such signal is then picked up by the control head 31 while the recording process is in progress, and is applied to a playback amplifier 47. Upon amplification, the played-back control signal is rectified at 48, to be amplified at 49 and applied as a direct-current signal to the upper input of the AND element 46, as seen in FIG. 1.

As indicated at 51 in FIG. 1, the recording monitor may also sense proper operation of the servo lock portion of the rotating recording head drive in a known manner, and may apply a signal indicating proper operation of the servo loop to the lower input of the AND element 46, as seen in FIG. 1.

According to a preferred embodiment of the invention, the frequency of the reproduced pilot signal is also examined or monitored. In practice, this yields valuable information about the proper operation of such essentials as the tape and head drives. For instance, if the capstan 16 should slip relative to the tape or the rotational rate of the head scanner 53 is incorrect, the frequency of the pilot signal reproduced at 26 will be affected.

The frequency of the played-back pilot signal may be monitored by making the amplifier 38 a bandpass amplifier designed to pass the known and steady frequency of the pilot signal produced at 21. If then the reproduced pilot signal substantially deviates from the latter constant frequency value, the output signal of the bandpass amplifier 38 drops materially, thereby disabling the recording monitor circuitry 37 from supplying an output signal sufficient to inhibit an alarm condition. Capstan slip, tape or head scanner speed variations, or other deviations affecting the frequency of the played-back pilot signal, will thus provoke an alarm condition in the recording monitoring process.

In the operation of the illustrated equipment, one or more of the heads may become clogged or may otherwise suffer a performance degradation. In practice, such degradations may not always be sufficient for detection by a monitoring circuit, even when they already affect the recording process.

In accordance with a further embodiment of the invention, the recording monitor is provided with a track-passage rate detection facility. For example, the amplifier 41 is designed as a bandpass amplifier tuned to the desired passage rate of the tracks 17 relative to the monitoring playback head 26. With such bandpass feature present in the monitor 37, loss of a single track, for instance, has a significant deteriorating effect on the detected pilot signal value which, in turn, releases an alarm condition.

The output of the AND element 46 thus supplies a signal if tape drive and recording head means are properly operating, the playback control signal generating and recording process is properly functioning, and the rotating head drive servo loop is properly functioning. Such signal provided by the AND element 46 inhibits an alarm condition at 45. On the other hand, if any of the inputs of the AND element 46 signifies a deficient operating condition, the output of the AND element goes low and an alarm condition at 45 results, indicating to the operator that the recording operation is not proceeding properly. Remedial action may then be taken to assure a perfect functioning of the recording process, without degradation or interruption of the information signal as recorded. The subject invention and its embodiments thus monitor the recording operation with the pilot signal reproduced during the recording operation. As long as the information signal is properly applied to the recording head means together with the pilot signal, the subject invention and its embodiments verify an actual recording of the information signal in the recording operation on the recording medium 13. As far as the loop including the monitoring head 26 and detectors 39 and 42 is concerned, the invention and its embodiments thus verify an actual recording of the information signal from the reproduced pilot signal while the recording operation is in progress.

While FIG. 1 shows only one recording head 23 in the recording apparatus 12, two or more heads may, of course, be employed, inasmuch as multiple head machines are well known for slant track and other recording purposes.

Figure 4:
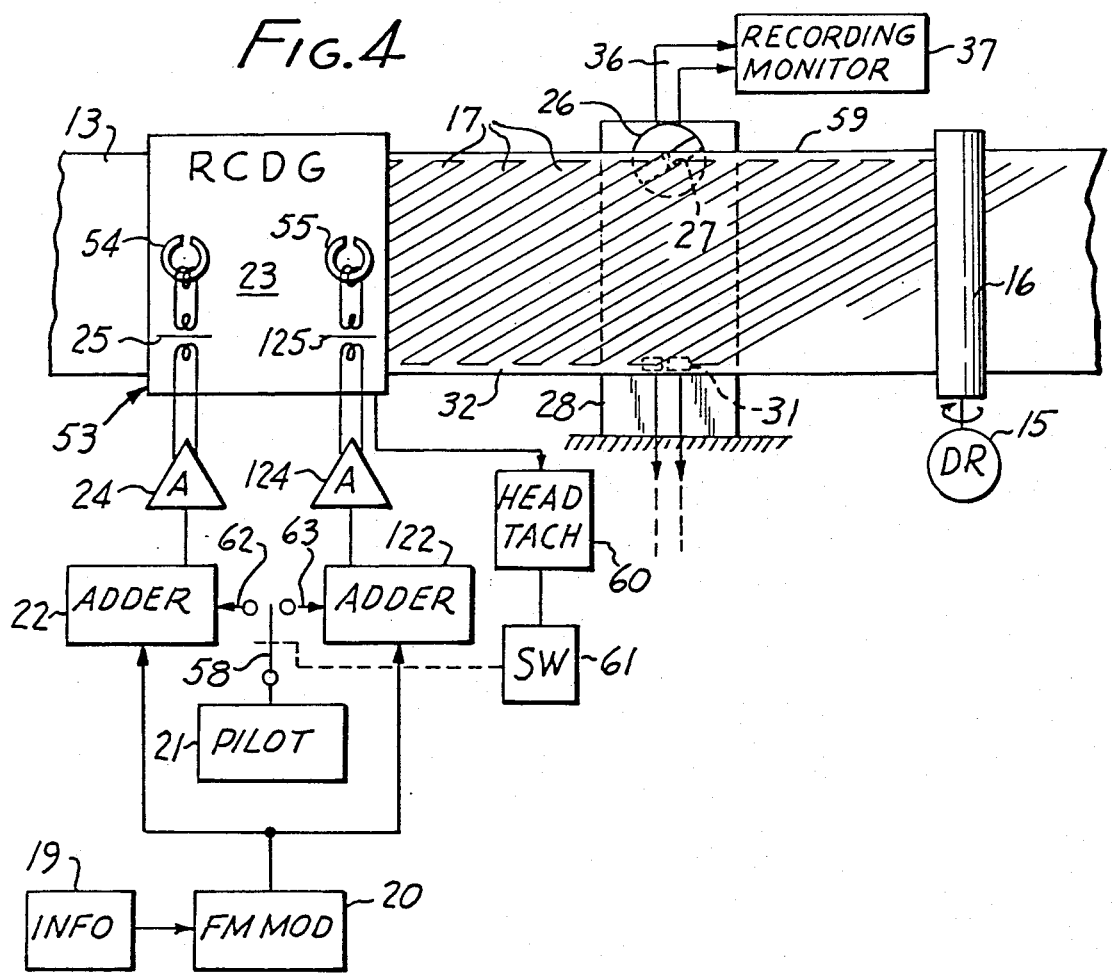
FIG. 4 is a diagrammatic showing of an information recording apparatus with recording process monitoring function.

By way of example, FIG. 4 diagrammatically illustrates a recording apparatus 53 with recording head means 23 including two rotating heads 54 and 55. These recording heads are supplied from information and pilot signal providing circuitry with recordable information and pilot signals via rotary transformers 25 and 125, respectively. Such circuitry may include the components 19 to 22 and 24 shown in FIG. 1, with a second pilot signal adder 122 and recording amplifier 124 being provided for the second head 55.

The recording head means 23 are again employed in the embodiment of FIG. 4 for recording both the information signal and the pilot signal, with the recording heads 54 and 55 providing overlap intervals in the recording of the information signal in the tracks 17. According to a further embodiment of the subject invention, the pilot signal is recorded in such overlap intervals. The currently discussed embodiment of the invention thus subjects the information and pilot signals to a kind of time division multiplexing, though not necessarily in the strict sense of the word. For instance, within the broad scope of the currently discussed aspect of the invention, the information and pilot signals may be recorded in different portions of the common recording tracks 17.

However, in a continuous recording operation the heads 54 and 55 move onto and off the tape 13 and provide overlap intervals in the recording of the information signal. For instance, if, say, the recording head 54 is at the trailing end of a slant track 17, the recording head 55 is already at the leading portion of the next track 17.

The portion of the information signal then occurring is thus simultaneously recorded in the respective trailing and leading track ends, creating overlap intervals and thus a certain redundancy in the recording of the information.

According to the subject embodiment, the pilot signal is recorded in such overlap intervals on the tape.

In this respect, the information and pilot signals may still be subjected to spectrum sharing, as indicated at $f_p$ and $f_p'$ in FIGS. 2 and 5. However, in view of the time division multiplexing or overlap interval recording function performed by the embodiment shown in FIG. 4, the pilot signal, as shown in dotted lines at 57 in FIG. 5, may have a frequency within the information frequency band 34.

The pilot signal generator 21 in the embodiment shown in FIG. 4 is connected to a switch 58 for applying the pilot signal to the recording head means 23 only in the overlap intervals of the information signal recording process in the tracks 17. According to a preferred embodiment of the invention, the pilot switch 58 is actuated at intervals so that the pilot signal is recorded in the trailing half-overlap of tracks 17. In particular, the pilot signal may be recorded in the trailing or in the upper portions of the recording tracks, that is in the upper margin 59 of the recording tape 13, as seen in FIG. 4.

To this end, the control signal picked up from the rotating head mount or from the control track 32 by head 31 may be employed for timing the switch 58. More appropriately, however, the head tachometer 60 typically present in slant track recording machines may be employed for this purpose. Especially, the so-called "once-around" tachometer is suitable in this respect, since it manifests angular recording head position. The switch 58 is symbolically shown as a contactor of the double-throw type which has a central rest position in which the pilot signal is not applied to either recording head. This corresponds to the interval in which either recording head 54 or 55 moves across the tape 13, recording the information signal in a slant track 17.

A switch driver 61, timed by the head tachometer 60, then closes the switch 58 against its contact 62 to apply the pilot signal to the rotating head 54 for recording in the trailing half-overlap of a track 17 in the upper tape margin 59. Thereafter, the switch driver 61 moves the switch 58 back to its central position, so that the next head 55 may record the information signal in the next slanted track without pilot signal interference.

As the head 55 then reaches its trailing half-overlap, the driver 61 closes the switch 58 against its other contact 63, whereby the pilot signal is again recorded in the upper tape margin 59.

In this manner, the subject aspect of the invention avoids interference between the recorded information and pilot signal without losing any useful information.

In particular, upon playback of the information signal, any useful information possibly lost by the recording of the pilot signal in the upper tape margin 59 is still available in the leading half-overlaps of the slant tracks 17 at the lower margin of the tape 13, as seen in FIG. 4.

In practice, the double-throw switch 58 with central rest position would be realized electronically, rather than mechanically.

The embodiment of the invention shown in FIG. 4 mounts the slanted monitoring head 26 at the upper margin 59 of the tape 13, for a pickup of the pilot signal recorded in the upper regions of the slanted tracks 17. The post 28 may again be employed for maintaining the pickup head 26 stationary relative to the advancing recording tape 13.

The recording process monitor 37 shown in FIG. 4 may be of the same type as the monitor 37 shown in FIG. 1. In particular, such monitor preferably again includes at least the components 38 to 43 shown in FIG. 1.

As an important point it is to be noted that the embodiment of the invention illustrated in FIG. 4 picks up the recorded pilot signal continuously during recording of the information signal and thus provides the recording monitor 37 with a continuous pilot signal, even though the pilot signal is recorded discontinuously via switching device 58. The recording monitor 37 thus has a reproduced continuous pilot signal to work from, and again provides an alarm condition if the pilot signal reproduced via head 26 indicates a deficiency in the information recording process.

The components 38, 41, 45 to 49 and 51 shown in FIG. 1, may also be employed in the embodiment of FIG. 4 for a more complete surveillance of the recording process and its various parameters.

The embodiment of FIG. 4 thus combines the advantage of non-interference of pilot and information signals with the feature of a nevertheless continuous recording monitoring function.

If desired, a sync word in the form of a recognizable bit pattern with which the playback process is controlled may be recorded in the practice of the subject invention. For instance, it is possible to employ such bit pattern to resolve ambiguities in the phase of the playback process brought about by such factors as a shrinking of the recording tape 13 between the recording and playback processes.

To provide a sync word, the pilot signal generated at 21 may be periodically interrupted by a multi-bit code word which is then detected upon playback by a digital matched filter (not shown) which selects a particular zero-crossing of the pilot wave which may be filtered and re-constituted as a square wave by means of a wideband phase-locked loop.

In a similar vein, the pilot signal recorded for recording process monitoring functions according to embodiments of the invention herein disclosed, may, upon playback of the recorded information from the tape, be also employed for time base correction purposes, particularly if such pilot signal is recorded continuously along with the information signal.

Except for the modifications and additions presently to be described, the embodiment of the subject invention shown in FIG. 6 is the same as the embodiment shown in FIG. 4, and reference should be had to the above description of FIG. 4 as far as the components which are the same as among the recording apparatus 53 shown in FIG. 4 and the recording apparatus 153 illustrated in FIG. 6 are concerned. As in the case of FIG. 4, reference may also be had to FIG. 1 and its above description when considering FIG. 6 and its description set forth below.

In the recorder 153 shown in FIG. 6, information to be recorded is applied from the information source 19 to an adder 222 for combination with a pilot signal provided by a pilot signal source 121. The adder 222 applies the combined information and pilot signal through switches 71 and 171 to modulators 20 and 120.

The information and sync word signal switches 71 and 171 in the embodiment of FIG. 6 are actuated by switch driver 61 which is timed by the head tachometer 60.

Each of the switches 71 and 171 is in its solidly illustrated position during the interval in which either recording head 54 or 55 moves across the tape 13 for recording the modulated information and pilot signals in a slant track 17. More specifically, the switches 71 and 171 in their solidly illustrated position apply the information signal from the source 19 and the pilot signal from the source 121 via adder 222 to modulators 20 and 120 which, for instance, may be of the frequency modulator type and which, as indicated in FIG. 6 at 73, preferably are synchronized with each other. As in the embodiment of FIG. 4, the modulated signal or signals are applied through adders 22 and 122 to recording amplifiers 24 and 124.

Recording amplifiers 24 and 124 apply the modulated combined pilot and information signals via rotary transformers 25 and 125 to the recording heads 54 and 55 which take turns in recording such modulated signals in tracks 17 common to the modulated informaton and pilot signals.

In the case of a continuous pilot signal which is recorded in the tracks 17 along with the information signal, spectrum sharing should be employed in order to avoid interference between the information and pilot signals. For instance, the pilot signal may be provided at a frequency so as to avoid substantial interference between the information and pilot signals and the information and pilot signal sidebands in the recorded modulated signals.

As in the embodiments of FIGS. 1 and 4, the recorder 153 shown in FIG. 6 reproduces a recorded pilot signal during the recording operation. However, where the pilot signal is added to and modulated along with the information signal as shown at 20, 120, 121 and 222, the verification playback head 26 cannot effectively reproduce the pilot signal provided at 121. Rather, the previously disclosed pilot signal source 21, adders 22 and 122 and switch 58 preferably are also employed in the embodiment of FIG. 8 in order to provide the recording monitoring head 26 with a reproducible recording monitoring or verification signal. The output of the verification head 26 is applied to the recording monitor 37, which may be composed and operated as already described above, such as in connection with the embodiment of FIG. 1.

The recording apparatus 153 shown in FIG. 6 includes a sync word generator 75 for providing a sync word which is recorded when the switches 71 and 171 are in their alternative position indicated by dotted lines in FIG. 6. As already indicated above, the sync word may be produced by periodically interrupting the pilot signal in a recognizable bit pattern. To this end, the pilot signal generated at 121 may also be applied to the sync word generator 75, such as by a line 76.

The sync word generator 75 may comprise apparatus for encoding the pilot signal 121. By way of example, various apparatus are known for encoding a continuous signal into variable bit patterns.

In this respect, FIG. 7 shows a specific binary bit pattern as may be produced by encoding the continuous pilot signal. With conventional encoders, the bit pattern may readily be varied by changing the positions of the binary "ones" and "zeros" in any desired manner.

In the embodiment shown in FIG. 6, two sources 21 and 121 are shown for providing two different signals, both of which are herein referred to as pilot signals. However, in order to avoid misunderstandings the signal provided at 21 may be seen as a recording operation monitoring pilot, while the signal provided at 121 may be seen as a playback data time base correction pilot. The recording operation monitoring pilot may be and preferably is the pilot signal disclosed above as provided by source 21 for recording monitoring purposes played back during the recording operation by monitoring head 26. In principle, both pilot signals could be derived from a single source. However, the two pilot signals typically are of substantially different frequency.

According to a preferred embodiment of the subject invention, the switches 71 and 171 are actuated by the switch driver 61 at different times to their alternative positions illustrated by dotted lines. In particular, each switch 71 and 171 is operated when the head 54 or 55 corresponding thereto is operating in one type of overlap interval.

For instance, the switch 71 may be actuated at intervals so that a sync word 78 is recorded in one type of overlap, such as the leading half-overlap, of odd-numbered tracks. The other switch 171 may be operated at intervals so that a sync word 78 is recorded in said one type of overlap, such as leading half-overlap, of the remaining or even-numbered tracks. The switch 58 may be actuated so that the recording monitoring pilot signal from source 21 is recorded in another type of overlap, such as the trailing half-overlap of the tracks 17. In particular, the recording monitoring pilot may thus be recorded in the upper portions of the recording track, that is in the upper margin 59 of the recording tape 13, as seen in FIG. 6.

With any switch 71 or 171 in its alternative position, the sync word 78 is applied to modulator 20 or 120 for recording in one type of half-overlap track portion via adder 22 or 122, recording amplifier 24 or 124, rotary transformer 25 or 125 and recording head 54 or 55.

Comparing at this juncture the embodiments of FIGS. 1 to 7, it is noted that the embodiment illustrated in FIG. 6 modulates a pilot signal 121 along with the information signal, while the embodiments of FIGS. 1 and 6, for instance, adds a pilot signal 21 to the modulated information signal.

Figure 8:
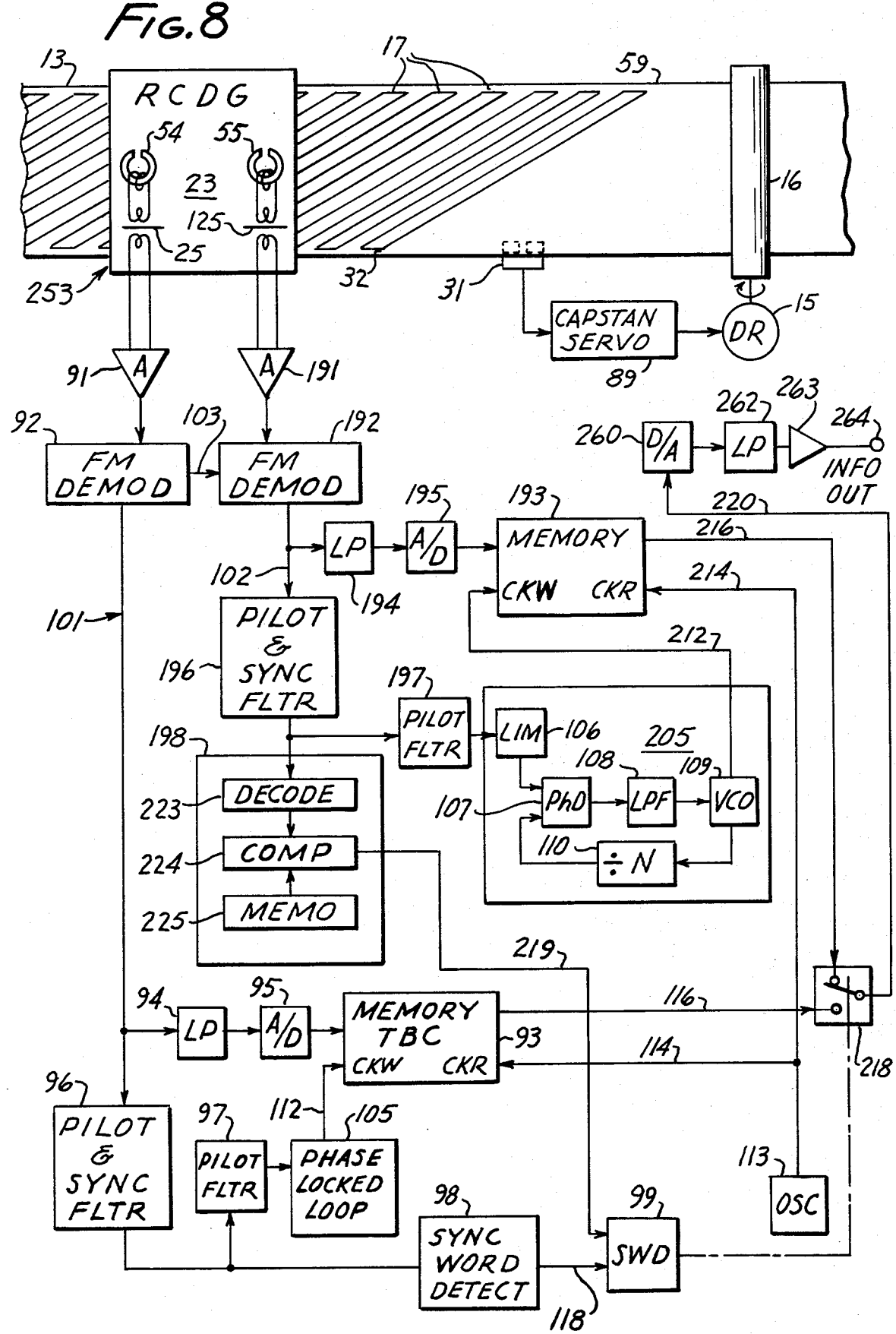
FIG. 8 is a diagrammatic showing of an information playback system, according to an embodiment of the subject invention.

The playback apparatus 253 shown in FIG. 8 may be the same as the recording apparatus 53 shown in FIG. 4 or 153 shown in FIG. 6, as far as the tape drive and capstan 15 and 16, the scanner 23 with magnetic heads 54 and 55 and rotary transformers 25 and 125, and the control signal head 31 are concerned. For instance, the head 31 may be employed for reproducing signals from a control track 32 for controlling playback servo means, including the capstan servo 89 shown in FIG. 8 which may be of a conventional type.

The magnetic heads 54 and 55 may be employed to pick up recorded information, pilot and sync word signals from the tape 13. To this end, the heads 54 and 55 may take turns in reproducing recorded signals from successive tracks 17.

The signals picked up by the rotating heads 54 and 55 are applied via rotating transformers 25 and 125 to playback amplifiers 91 and 191, respectively. The amplified output signals of these components 91 and 191 are applied to demodulators 92 and 192 which correspond to the modulators 20 and 120, being capable of demodulating signals modulated at 20 and 120, respectively.

The output of the demodulator 92 is supplied to a time base correcting circuit (TBC) 93 via a low pass filter 94 which removes the sync word and pilot signal, applying the demodulated played-back information signal to an analog-to-digital converter 95 at the input of the time base correcting apparatus 93.

The output of the demodulator 92 is also applied to a pilot and sync word filter 96 which is a low pass filter having a higher bandwidth than the filters 94 and 194 so as to apply the demodulated played-back pilot signal to a pilot signal filter 97 and to a sync word detector 98 which derives the sync word, such as the sync word 78 illustrated in FIG. 7, from the filter 96 and accordingly actuates a switch driver 99 as more fully disclosed below.

The components of the first demodulator and time base correction branch just described, starting with the demodulator 92 and extending to the sync word detector 98, are duplicated or have corresponding counterparts in the second demodulator and time base correcting branch. Corresponding components as among the first and second branches 101 and 102 are designated in the second branch 102 by the same reference numerals as in the first branch 101, except that a "1" has been added at the beginning of each reference numeral for corresponding components shown in the second branch 102.

As in the case of modulators 20 and 120 in FIG. 6, the demodulators 92 and 192 are ganged or synchronized with each other as indicated at 103.

The pilot filters 97 and 197 in the branches 101 and 102 are narrow bandpass filters which pass only the played-back pilot signal having a pilot signal frequency varying according to time base errors induced by such factors as stretching or variation of the recording medium or tape 13 and other factors well known in the recording art.

Played-back pilot signals thus extracted are applied by filters 97 and 197 to phase locked loops 105 and 205, respectively. The contents of phase locked loops 105 and 205 may be identical and will now be described using the phase locked loop 205 as an example.

In particular, the played-back pilot signal is applied to a limiter 106 which may be externally or internally of the phase locked loop. The thus amplitudelimited played-back pilot signal is applied to one input of a phase detector 107. The output of such phase detector is applied to a loop filter 108 which, in turn, is connected to a voltage controlled oscillator 109. The output of the voltage controlled oscillator 109 is applied to a divider 110 which, in turn, is connected to the second input of the phase detector 107.

The voltage controlled oscillator 109 provides a square wave output which follows the time base variations of the played-back pilot signal. Lines 112 and 212 are shown in FIG. 8 for applying the output signals of the voltage controlled oscillators in the phase locked loops 105 and 205 as clock signals to the time base correctors 93 and 193, respectively, which may be of a digital type, employing analog-to-digital converters 95 and 195 at their inputs or integral therewith.

In particular, the time base correctors 93 and 193 may be of a digital memory type in which played-back information signals, received via low pass filters 94 and 194 and digitized at 95 and 195 are respectively clocked into memory by the square wave outputs of the phase locked loops 105 and 205 which are applied via lines 112 and 212 to "write clock" inputs (CKW) of the time base correctors or memories 93 and 193.

The digitized played-back information signals are thus briefly stored in the memories at 93 and 193 and are clocked out at a fixed rate, whereby time base errors are eliminated therefrom. To this end, a crystal controlled oscillator 113 applies clock pulses of stable frequency via lines 114 and 214 to "read clock" inputs (CKR) of the time base correctors or memories 93 and 193, respectively. The resulting clocked-out time base corrected digital information signals are applied via lines 116 and 216 to inputs of a switch 218. As symbolically indicated in FIG. 8, the switch 218 is of a double-throw type, applying information signals received via lines 116 and 216 to a common digital information output line 220 for conversion to an analog information signal by a digital-to-analog converter 260 and amplification by an output amplifier 263. A low pass filter 262 serves to remove clock ripple and high frequency switching transients from the time base corrected information signal.

The time base corrected amplified information signal appears at an output 264 for further processing and display, printout, storage or other handling. The information produced or provided at 19 in FIG. 6 for recording at 153 is thus reproduced after playback at 253 in FIG. 8.

The output of the pilot and sync word filter 96 or 196 is also applied to a sync word detector 98 or 198. As seen in FIG. 8 at 198, these sync word detectors include a decoder 223 which derives the sync word, such as the sync word 78 illustrated in FIG. 7 from the filter 96 or 196 and applies such derived sync word to a comparator 224. Comparator 224 also receives from a memory 225 a stored sample of the sync word to be detected and issues via a line 118 or 219 an actuation signal to the switch driver 99. The switch driver 99 may be of a bistable or flip-flop type which actuates the switch 218 to a first position in response to an actuating signal received via line 118, and to the alternative second position in response to an actuating signal received via line 219, whereby played-back time base corrected information signals received via lines 116 and 216 are composed and applied to a common information signal output line 220.

FIG. 9 is a timing diagram illustrating the operation of a preferred recording/playback embodiment, such as the embodiment illustrated in FIGS. 6 to 8.

In the timing diagram of FIG. 9, recordings or tracks 271 to 275 corresponding to adjacent tracks 17 on the tape 13 are shown. In particular, 271, 272, 273, 274 and 275 depict envelopes of signals recorded in tracks on the tape 13 by the rotating recording heads 54 and 55 taking turns as disclosed above with the aid of FIG. 6.

In the timing diagram of FIG. 9, $t_1$ designates the instant at which the signal-to-noise ratio of a signal being recorded in recording 272 becomes adequate for recording and playback purposes. A pulse 276 in FIG. 9 indicates the recording of a sync word, such as the sync word 78 shown in FIG. 7.

The recording of the sync word at 276 terminates at time $t_2$ when the corresponding sync word switch, either 71 or 171 is switched to its information recording position. At time $t_3$, the signal-to-noise ratio of the trailing one-half overlap of the recording envelope 271 starts to become inadequate for recording and playback purposes. Other sync word recordings are indicated at 277, 278 and 279 in FIG. 9. As seen in FIG. 9, the sync words 276 to 279 are recorded in overlap intervals in the recordings 271 to 275. This embodiment of the invention thus subjects the sync word and information signals to a kind of time division multiplexing as explained above for the embodiment shown in FIG. 4 with respect to the pilot signal.

In the case of the embodiment illustrated in FIG. 9, the sync words 276 and 277 are recorded in tracks 17 in the leading half-overlaps of recordings 272 and 274 for subsequent playback therefrom. Similarly, the sync words 278 and 279 are recorded in tracks 17 in the leading half-overlaps of recordings 273 and 275 for subsequent playback therefrom. FIG. 9 thus illustrates possible phases of operation of the recorder 153 of FIG. 6 and the playback apparatus 253 of FIG. 8.

In case the sync words 276, etc. should be recorded in the trailing one-half overlap of recording 271, etc., such recording should take place somewhat ahead of time $t_3$, such as at the time shown in FIG. 9 for 276.

Waveforms 281 and 282 in FIG. 9 illustrate operation of the switch 218. In particular, waveform 281 shows at 283 that switch 218 connects line 220 to line 216 for playback or reading of information from the envelope 272. Conversely, waveform 282 shows at 285 that switch 218 connects line 200 to line 116 for playback or reading of information from the envelope 273. For reasons of available space, the envelopes 272 and 274 are shown somewhat foreshortened, but the switching and sync word recording principle is the same for all tracks 17, with the switch 218 being in fact typically formed of very fast acting electronic components in a conventional manner.

The switch or read gate 218 is thus sequentially actuated by the reproduced and detected sync words 276, 278, 277 and 279 to apply sequentially the reproduced and time base corrected information signals derived from recordings 272, 273, 274 and 275 to the common output line 220 and components 260 to 262, for presentation of a reconstituted information signal or signal series at output 264.

FIG. 8 shows one possible use of the recorded and played-back sync word which may be employed to reconstitute the information signal from two recording and playback channels.

If desired, the sync word may also be employed to control other aspects of the playback process. For instance, the played-back and detected sync word may be employed to correct the phase of the rotating playback heads 54 and 55 so as to make sure that these heads follow exactly their intended track among the recorded slant tracks 17. A major advantage of the disclosed system in this respect is that the sync word may, for instance, be within the information band, as shown at 57 in FIG. 5, without causing interference with the recorded information signal, as it is time multiplexed therewith as herein disclosed.

Considering FIGS. 6 to 9 and the above disclosure connected therewith, it may be seen that the subject invention discloses information recording and playback methods and apparatus providing recording means 153 including two recording heads 54 and 55 and providing a recordable information signal, such as at 19, and a synchronization or "sync" word signal, such as at 75 or such as shown at 78 in FIG. 7. The recording or recording head means 153 are employed for recording both the information signal and the synchronization word signal in a recording operation, such as in the operation disclosed in connection with FIG. 6. The recording heads 54 and 55 thereby provide overlap intervals as indicated, for instance, at $t_1$ to $t_3$ in FIG. 9 in the recording of the information signal, with the synchronization word signal being recorded in such overlap intervals, such as indicated at 276, 277, 278 and 279 in FIG. 9.

The thus recorded information and synchronization word signals are reproduced from the recording medium 13, such as in the manner shown in FIG. 8, and at least part of the reproduction of the information signal may be controlled with the reproduced synchronization word signal. Such control, as disclosed above by way of example, may comprise the reconstitution of information signals reproduced from alternative recording tracks 17, such as with the aid of an electronic switch 218 actuated in response to reproduced and detected synchronization word signals. Other aspects of the playback process that may be controlled or adjusted with the synchronization word signal have also been disclosed above.

Where the information signals are recorded with the aid of recording heads 54 and 55 in slanted tracks 17 on an advancing recording medium, and where such slanted tracks have overlap interval portions as disclosed, for instance, at $t_1$ to $t_3$ in FIG. 9, the synchronization word signal may be recorded on the recording medium 13 with the aid of the recording heads 54 and 55 in predetermined ones of the overlap intervals. In this respect, it has been mentioned above that the synchronization word signal shown, for instance, at 276 in FIG. 9 may be recorded in either the leading one-half overlap of the information signal 272 or the one-half trailing overlap of the information signal 271. In this and other respects herein disclosed, the expression "information signal" should, of course, be interpreted broadly, so as to include, for instance, not only the picture portions, but also the picture synchronization portions, including, for instance, the vertical synchronization signals, of a video signal. This just by way of example, since the subject invention is, of course, not limited to video signals as far as its broad utility is concerned.

The reproduction of the synchronization word signal includes reproduction of such synchronization word signal from the predetermined ones of the overlap intervals, as disclosed above.

As also disclosed with the aid of FIGS. 6 and 7, including the components 21, 22 and 122 shown in FIG. 6 and the components 93, 193, 97, 197, 105 and 205 shown in FIG. 8, the disclosed provision and utilization of synchronization word signals may be combined according to an embodiment of the subject invention with the provision and utilization of a pilot signal which is recorded with the recording head means 153 or heads 54 and 55 in a multiplexed manner with the recordable information signal. In this respect, the so-called "multiplexed manner" may, for instance, comprise a frequency sharing of the type shown at $f_p$ in FIG. 2 or $f'_p$ shown in FIG. 5, so as to avoid interference between pilot, synchronization word and information signals.

If desired, such interference may be avoided by spatial or time multiplexing, rather than by frequency multiplexing or time sharing. For instance, as shown in FIG. 9, the synchronization word signals 276 to 279 may be recorded in overlap intervals of the information signals 271 to 275. Similarly, where synchronization word signals are, for instance, recorded in leading one-half overlap intervals, pilot signals may be recorded in trailing one-half overlap intervals, to mention only one of many possibilities.

As before, the pilot signals as recorded may be reproduced during the recording operation and may be employed for monitoring the recording operation with the reproduced pilot signal right during the recording operation, as disclosed above, with the aid of FIGS. 1, 4 and 6, for instance. Moreover, a recorded pilot signal may be reproduced also during the reproduction of the information signal, and may, for instance, be employed for correcting time base errors in the reproduced information signal with the pilot signal reproduced during reproduction of such information signal, as disclosed above with the aid of FIG. 8.

In practice, the recording apparatus shown in FIG. 6 and the playback apparatus shown in FIG. 8 may be combined into one recorder/playback apparatus as customary in many fields.

The subject extensive disclosure will suggest or render apparent to those skilled in the art various modifications and variations within the spirit and scope of the disclosed invention and equivalents thereof.

I claim:

1. In an information recording apparatus having at least two movable recording heads arranged for making successive operative recording sweeps across a magnetic tape wherein an initial portion of a recording sweep of one head overlaps in time with a final portion of a recording sweep of a second head, to provide uninterrupted recording of an information signal in a recording format in which information recorded during an overlap interval is duplicated, the improvement comprising:
   a. synchronizing means, operable during the overlap interval, for producing a synchronization signal; and
   b. timing means, operably associated with at least one of the recording heads and said synchronizing means, for time division multiplexing of the synchronization signal and the information signal, to cause one of the recording heads to temporarily interrupt the recording of the information signal to record the synchronization signal during the overlap interval, whereby the portion of the information signal lost by the time division multiplexing of the synchronization signal is recorded by the other of the heads.

2. Apparatus as defined in claim 1 wherein said timing means is operated alternately with the recording heads in synchronism with their respective operative sweeps across the tape.

3. Apparatus as defined in claim 1 wherein said timing means is operated in synchronism with the recording head initiating its sweep for time division multiplexing of the synchronization signal with the information signal applied to the head initiating its sweep.

4. Apparatus as defined in claim 2 in which the synchronization signal functions to control an operation relating to the playback of the information signal.

5. Apparatus as defined in claim 4 in which the information signal is recorded together with a continuous pilot signdl for time-base correction of the information signal during playback, wherein said synchronizing means includes generating means, responsive to the pilot signal, for producing the synchronization signal.

6. Apparatus as defined in claim 5 wherein said generating means encodes the pilot signal into a binary bit pattern representative of the synchronization signal.

7. Apparatus as defined in claim 2 wherein said timing means includes tachometer means, responsive to the recording heads, for producing a control signal corresponding to the position of the recording heads relative to their respective operative sweeps, wherein said timing means includes switching means, responsive to the control signal, for causing the time division multiplexing of the synchronization signal with the information signal.

* * * * *

UNITED STATES PATENT OFFICE
CERTIFICATE OF CORRECTION

PATENT NO. : 4,489,354
DATED : December 18, 1984
INVENTOR(S) : Bert H. Dann

It is certified that error appears in the above-identified patent and that said Letters Patent are hereby corrected as shown below:

Col. 14, Line 3    delete "amplitudelimited" and substitute therefor --amplitude-limited--

Col. 18, Line 36   delete "signdl" and substitute therefor --signal--

Col. 18, Line 47   delete "wherein said tim-" and substitute therefor --and--

Col. 18, Line 48   delete "ing means includes"

Signed and Sealed this

Thirtieth Day of July 1985

[SEAL]

Attest:

DONALD J. QUIGG

Attesting Officer     Acting Commissioner of Patents and Trademarks